United States Patent
Reed

(10) Patent No.: US 6,536,826 B1
(45) Date of Patent: Mar. 25, 2003

(54) FOLDABLE CARGO BOX

(75) Inventor: Troy Reed, Livonia, MI (US)

(73) Assignee: Plastech Engineered Products, Dearborn, MI (US)

(*) Notice: Subject to any disclaimer, the term of this patent is extended or adjusted under 35 U.S.C. 154(b) by 0 days.

(21) Appl. No.: 10/015,435

(22) Filed: Dec. 13, 2001

(51) Int. Cl.$^7$ ................................................ B60N 3/12
(52) U.S. Cl. .................... 296/37.5; 296/376; 224/542; 224/404
(58) Field of Search .......................... 296/37.5, 37.6, 296/100.09, 100.06, 181; 312/257.1; 224/542, 404, 42.33

(56) References Cited

U.S. PATENT DOCUMENTS

| | | | |
|---|---|---|---|
| 1,242,035 A | 10/1917 | Pierson | |
| 1,266,521 A | 5/1918 | Norquist | |
| 1,272,620 A | 7/1918 | Carlson | |
| 1,289,997 A | 12/1918 | Wyeth | |
| 1,655,777 A | 1/1928 | Weiland | |
| 1,764,615 A | 6/1930 | Edwards | |
| D160,213 S | 9/1950 | Samuelson | D14/6 |
| 2,621,357 A | 12/1952 | Stuman | 16/114 |
| 2,626,179 A | 1/1953 | Gonzalez | 296/26 |
| 2,720,414 A | 10/1955 | Hart | 296/12 |
| 2,795,363 A | 6/1957 | Turner | 224/42.43 |
| 3,800,990 A * | 4/1974 | Richardson | 224/542 |
| 3,902,599 A | 9/1975 | Stromberg | 206/511 |
| 4,023,850 A | 5/1977 | Tillery | 296/26 |
| 4,136,905 A | 1/1979 | Morgan | 296/50 |
| 4,419,794 A | 12/1983 | Horton, Jr. et al. | 24/667 |
| 4,451,075 A | 5/1984 | Canfield | 296/37.6 |
| 4,470,716 A | 9/1984 | Welch | 403/254 |
| 4,472,639 A | 9/1984 | Bianchi | 296/26 |
| 4,531,773 A | 7/1985 | Smith | 296/26 |
| 4,573,730 A | 3/1986 | Gondert et al. | 296/1 |
| 4,596,417 A | 6/1986 | Bennett | 296/61 |
| 4,635,992 A | 1/1987 | Hamilton et al. | 296/37.6 |
| 4,652,035 A | 3/1987 | Austin, Jr. | 296/1 |
| D291,789 S | 9/1987 | Noga | D12/98 |
| 4,749,226 A | 6/1988 | Heft | 296/37.6 |
| 4,750,773 A | 6/1988 | Chapline et al. | 296/37.6 |
| 4,778,213 A | 10/1988 | Palmer | 296/26 |
| 4,786,119 A | 11/1988 | Smuda | 312/195 |
| D300,734 S | 4/1989 | Kruitbosch | D12/155 |
| 4,824,158 A | 4/1989 | Peters et al. | 296/37.6 |
| 4,828,312 A | 5/1989 | Kinkel et al. | 296/37.6 |
| 4,830,242 A | 5/1989 | Painter | 224/42.32 |
| 4,911,296 A * | 3/1990 | Hart, Jr. | 224/542 |
| 4,951,867 A * | 8/1990 | McManus | 224/542 |
| 5,024,409 A | 6/1991 | Bohnen | 248/222.4 |
| 5,037,153 A | 8/1991 | Stark | 296/37.6 |
| 5,083,829 A | 1/1992 | Fonseca | 296/37.6 |
| D326,076 S | 5/1992 | Wiese | D12/155 |

(List continued on next page.)

Primary Examiner—Kiran Patel
(74) Attorney, Agent, or Firm—Bliss McGlynn, P.C.

(57) ABSTRACT

A vehicle cargo box system is provided including a first brace member affixed to a surface of a wall of the vehicle, a first panel rotatably fastened to one edge of the brace member, and a second panel rotatably fastened to one edge of the first panel so as to enable the first and second panels to be deployed by rotating the respective panels in the appropriate direction. In this manner, a secure box-shaped enclosure is formed adjacent the cab portion of the vehicle and provides for storing tools and implements therein. When the cargo box is not required to be deployed, the respective panels are rotated in the appropriate opposite direction and are secured against the first brace member so as to increase the available cargo area on the bed surface of the vehicle. An optional second brace member is provided for engagement to the second panel to prevent unintended rotation of the second panel. Furthermore, optional lock systems can be provided for securing the system or components thereof to the various surfaces of the vehicle.

25 Claims, 8 Drawing Sheets

U.S. PATENT DOCUMENTS

| | | | |
|---|---|---|---|
| 5,114,203 A | 5/1992 | Carnes | 296/50 |
| 5,123,691 A | 6/1992 | Ginn | 296/37.1 |
| 5,147,103 A | 9/1992 | Ducote | 296/37.6 |
| 5,154,470 A | 10/1992 | Bringman, Jr. | 296/26 |
| 5,169,200 A | 12/1992 | Pugh | 296/37.6 |
| 5,201,561 A * | 4/1993 | Brown | 296/37.5 |
| 5,201,562 A | 4/1993 | Dorsey | 296/39.2 |
| 5,253,913 A | 10/1993 | Metivier | 296/37.6 |
| 5,382,069 A * | 1/1995 | Chambers | 296/37.6 |
| 5,468,038 A | 11/1995 | Sauri | 196/57.1 |
| D365,323 S | 12/1995 | Napierkowski et al. | D12/414 |
| 5,622,296 A | 4/1997 | Pirhonen et al. | 224/197 |
| 5,658,033 A | 8/1997 | Delaune | 296/26 |
| 5,700,047 A | 12/1997 | Leitner et al. | 296/26 |
| 5,730,342 A | 3/1998 | Tien | 224/271 |
| 5,743,589 A | 4/1998 | Felker | 296/180.5 |
| 5,752,800 A | 5/1998 | Brincks et al. | 414/537 |
| 5,755,480 A | 5/1998 | Bryan | 296/26 |
| 5,765,892 A | 6/1998 | Covington | 296/26 |
| 5,775,759 A | 7/1998 | Cummins | 296/26 |
| 5,806,907 A | 9/1998 | Martinus et al. | 296/26.11 |
| 5,820,188 A | 10/1998 | Nash | 296/26 |
| 5,853,116 A | 12/1998 | Schreiner | 224/404 |
| 5,857,724 A | 1/1999 | Jarman | 296/26 |
| 6,113,173 A | 9/2000 | Leitner et al. | 296/26.11 |
| 6,174,012 B1 * | 1/2001 | Saffold | 296/37.6 |
| 6,183,035 B1 * | 2/2001 | Rusu et al. | 296/100.09 |
| 6,217,103 B1 * | 4/2001 | Schultz et al. | 296/37.6 |
| 6,224,138 B1 * | 5/2001 | Adsit et al. | 296/37.6 |
| 6,257,640 B1 | 7/2001 | Leitner et al. | 296/37.6 |
| 6,290,277 B1 * | 9/2001 | Spykerman et al. | 296/37.5 |
| 6,375,054 B1 * | 4/2002 | Lance et al. | 296/37.6 |
| 6,390,527 B1 * | 5/2002 | Leftridge | 296/37.6 |
| 6,401,995 B1 * | 6/2002 | Yuille et al. | 224/404 |
| 6,428,079 B1 * | 8/2002 | Van Dyke | 296/100.09 |
| 6,454,148 B1 * | 9/2002 | Cook | 224/404 |
| 2001/0017474 A1 * | 8/2001 | Leitner et al. | 296/37.6 |
| 2002/0014505 A1 * | 2/2002 | Lance et al. | 296/37.6 |
| 2002/0014777 A1 * | 2/2002 | Gehring et al. | 296/37.5 |
| 2002/0101088 A1 * | 8/2002 | Rigau et al. | 296/37.6 |

\* cited by examiner

FOLDABLE CARGO BOX

BACKGROUND OF THE INVENTION

1. Field of the Invention

The present invention relates, generally, to a vehicle cargo box, and more specifically, to a vehicle cargo box system that defines an enclosure that is capable of being selectively positioned in a first deployed position and a second stored position, wherein a first panel of the enclosure is rotatable relative to a first brace member affixed to a wall surface of the vehicle, and a second panel of the enclosure is rotatable relative to the first panel of the enclosure and is intended to engage an optional second brace member affixed to the bed surface.

2. Description of the Related Art

Pickup trucks and like vehicles have cargo areas that are employed for utilitarian purposes. As is well known in the art, such vehicles typically include a forward cab portion in which the vehicle operator sits and a rear cargo area for receiving cargo and the like. As noted, the cargo area is typically disposed adjacent and to the rear of the cab. The cargo area is typically defined by a substantially flat bed surface and a pair of upstanding sidewalls spaced from one another on either side of the bed surface. In addition, the vehicle typically includes a rear wall or "tailgate" that extends between the pair of sidewalls at one end of the bed surface and a front wall located at the other end of the bed surface opposite to the tailgate.

Numerous accessories have been developed for the purpose of augmenting the utilitarian functions of the cargo area in such vehicles. For example, toolboxes and other similar storage devices have been employed to provide a secure enclosure for storing tools and other valuable implements in the otherwise open cargo area of vehicles, such as pickup trucks. Such toolboxes and the like are typically mounted between the sidewalls and the front wall proximate to the cab of the vehicle. While such toolboxes adequately function for their intended purposes, they also act to reduce the remaining available cargo area of the vehicle. Therefore, the consumer has had to make a difficult choice between either having an adequate amount of cargo area or ensuring the security of the consumer's tools and implements.

Accordingly, there has been increased interest in structures that can selectively function as a storage device when needed and then can be either easily removed or stowed out of the way so as to provide increased cargo area to the vehicle.

One proposed approach to overcoming this problem could be found with reference to U.S. Pat. No. 6,257,640 to Leitner et al., the entire specification of which is incorporated herein by reference, which discloses a collapsible storage device including a first panel and a second panel, with one end of the first panel rotatably secured to one wall of a vehicle bed. One end of the second panel is rotatably secured to the opposite end of the first panel. The device has a deployed or storage position in which the first panel is substantially horizontal and the second panel is substantially vertical so that the two panels, in cooperation with the existing walls of the bed, form an enclosed container. The device also has a folded position in which the second panel is folded against the first panel, and the first panel together with the second is folded against a wall of the vehicle bed. The collapsible storage device has an arrangement for locking the device in the deployed and/or the folded position. Alternatively, the device may have an arrangement means for locking the two panels together during deployment and/or retraction, or the device may be interposed between two storage bins along a wall of the vehicle bed. A track or tracks may be provided on one or both sides of the storage device to coact with a track follower on one or both sides of the second panel to provide easier collapse or deployment of the device.

Although the device described in U.S. Pat. No. 6,257,640 to Leitner et al. represented an improvement over conventional storage devices, it still suffered from several significant deficiencies, such as the fact that the first panel is directly mounted to the front wall of the bed at a single point along the upper end of the front wall. This creates a high stress area where the first panel is joined to the front wall as the first panel is repeatedly rotated upwardly and/or downwardly, as well as when heavy items (e.g., power tools, water coolers, and the like) are either placed or dropped onto the top surface of the first panel, despite the presence of the optional reinforcing members in both of the panels.

Accordingly, there remains a need in the art for a device that can function as a collapsible storage device for use in conjunction with the cargo area of pickup trucks for securing tools and implements therein, wherein the device is rugged and sturdy and thus can withstand the rigors of repeated heavy use.

SUMMARY OF THE INVENTION AND ADVANTAGES

In accordance with a first embodiment of the present invention, a collapsible storage box system mountable on a vehicle having a substantially horizontally oriented bed surface surrounded by a front wall, a first sidewall, and a spaced and opposed second sidewall is provided. The system comprises a brace member fastened to the front wall, a first panel secured adjacent to the brace member so that the first panel is rotatable about a substantially horizontal first axis; and a second panel secured to the first panel so as to be rotatable about a substantially horizontal second axis. The system is operable to assume a collapsed position in which either the first panel or the second panel is substantially vertically oriented against the front wall and depend from the first axis. The system is also operable to assume a deployed position in which the first panel is substantially horizontally oriented and the second panel is substantially vertically oriented.

In accordance with a second embodiment of the present invention, a collapsible storage box system mountable on a vehicle having a substantially horizontally oriented bed surface surrounded by a front wall, a first sidewall, and a spaced and opposed second sidewall is provided. The system comprises a brace member having a first end and a second end, a first side and a second side. The first side is adjacent to the front wall, and the brace member is fastened to the front wall. The system also includes a first panel having an inner face and an outer face, a first end and a second end, a first side and a second side. The first end of the first panel is secured adjacent to the second side of the brace member so that the first panel is rotatable about a substantially horizontal first axis. In this embodiment of the present invention, the collapsible storage box system also includes a second panel having an inner face and an outer face, a first end and a second end, a first side and a second side. The first end of the second panel is secured to the second end of the first panel so as to be rotatable about a substantially horizontal second axis. The system is operable to assume a collapsed position in which either the first panel or the second panel is substantially vertically oriented against the front wall and depend from the first axis and the inner face of the first panel and the inner face of the second panel face one another. The system is also operable to assume a deployed position in which the first panel is substantially horizontally oriented and the second panel is substantially vertically oriented, the outer face of the first panel facing outwardly away from the bed surface and the outer face of the second panel facing outwardly away from the first panel.

In accordance with a third embodiment of the present invention, a collapsible storage box system mountable on a vehicle having a substantially horizontally oriented bed surface surrounded by a front wall, a first sidewall, and a spaced and opposed second sidewall is provided. The system comprises a first brace member having a first end and a second end, a first side and a second side. The first side is adjacent to the front wall, and the first brace member is fastened to the front wall. The system also includes a first panel having an inner face and an outer face, a first end and a second end, a first side and a second side. The first end of the first panel is secured adjacent to the second side of the brace member so that the first panel is rotatable about a substantially horizontal first axis. In this embodiment of the present invention, the collapsible storage box system also includes a second panel having an inner face and an outer face, a first end and a second end, a first side and a second side. The first end of the second panel is secured to the second end of the first panel so as to be rotatable about a substantially horizontal second axis. The system also includes a second brace member having a first end and a second end, a first side and a second side. The first side is adjacent to the bed surface, the second brace member is fastened to the bed surface, and the second panel engages the second brace member. The system is operable to assume a collapsed position in which either the first panel or the second panel is substantially vertically oriented against the front wall and depend from the first axis and the inner face of the first panel and the inner face of the second panel face one another. The system is also operable to assume a deployed position in which the first panel is substantially horizontally oriented and the second panel is substantially vertically oriented, the outer face of the first panel facing outwardly away from the bed surface and the outer face of the second panel facing outwardly away from the first panel.

One advantage of the cargo box system of the present invention is that it serves to selectively deploy and collapse the cargo box.

Another advantage of the cargo box system of the present invention is that it serves to secure the contents of the cargo box therein.

Another advantage of the cargo box system of the present invention is that serves to increase the overall durability of the cargo box.

Another advantage of the cargo box system of the present invention is that is serves to selectively increase and decrease the cargo area of a vehicle.

Another advantage of the cargo box system of the present invention is that it is easy to install onto a vehicle as a factory-installed item or as an after-market item.

Another advantage of the cargo box system of the present invention is that it is lightweight, rugged, easily manufactured, and inexpensive.

Other advantages of the present invention will be readily appreciated, as the same becomes better understood by reference to the following detailed description when considered in connection with the accompanying drawings as described below.

BRIEF DESCRIPTION OF THE DRAWINGS

The same reference numerals refer to the same parts throughout the various Figures.

DETAILED DESCRIPTION OF THE PREFERRED EMBODIMENTS

Figure 1:
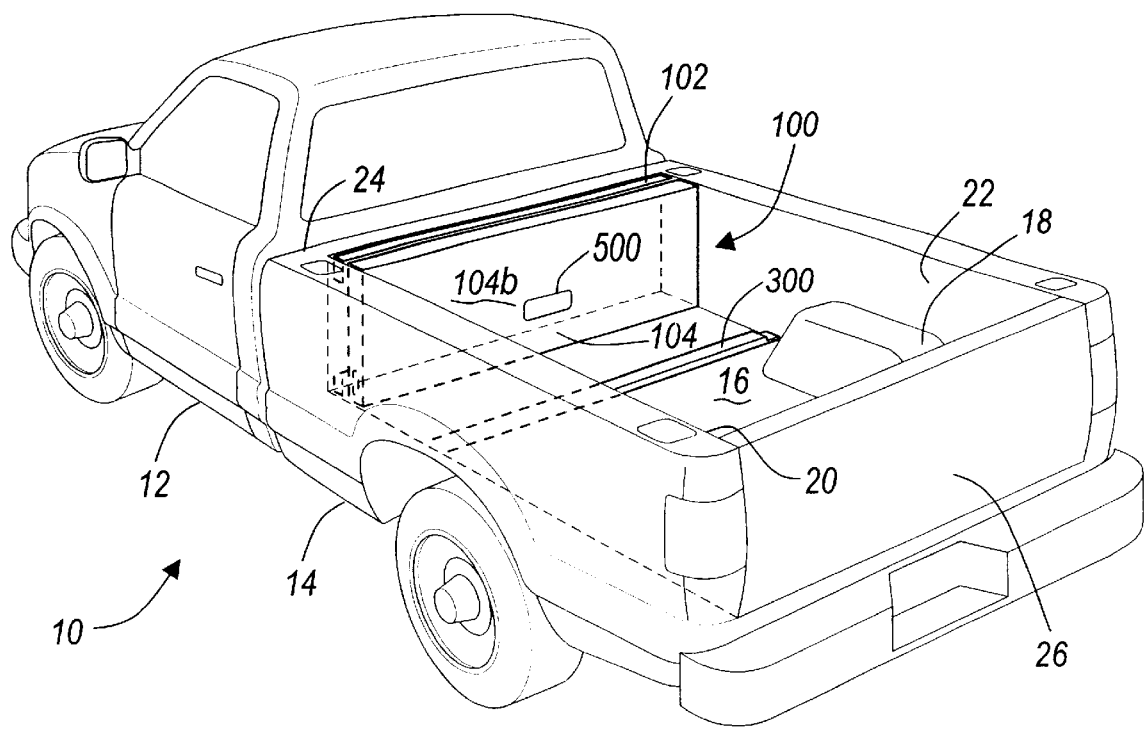
FIG. 1 is a perspective view of a cargo box system in the stowed position, in accordance with the general teachings of the present invention.
Figure 2:
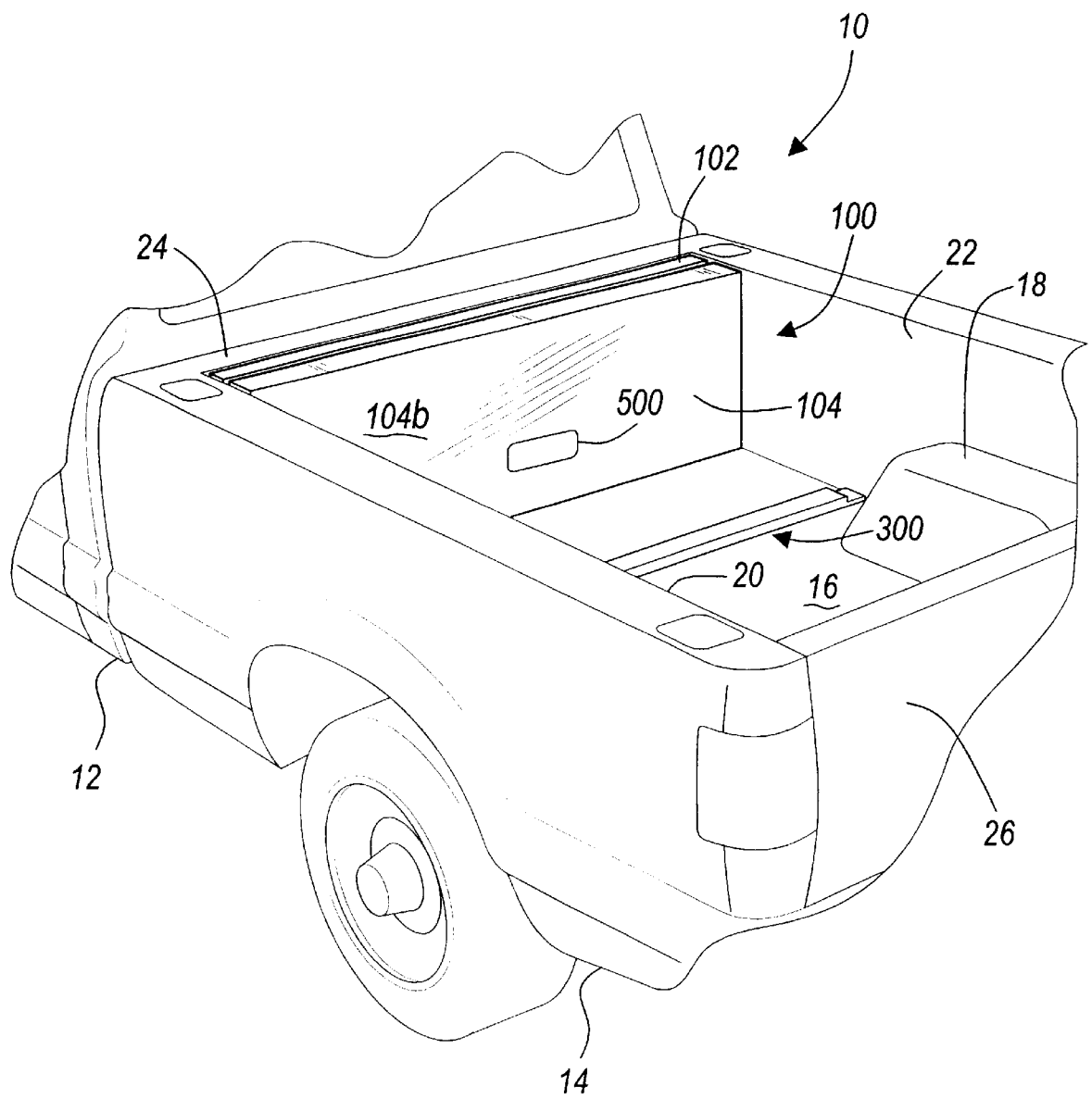
FIG. 2 is a partial perspective view of a cargo box system in the stowed position, in accordance with the general teachings of the present invention.
Figure 3:
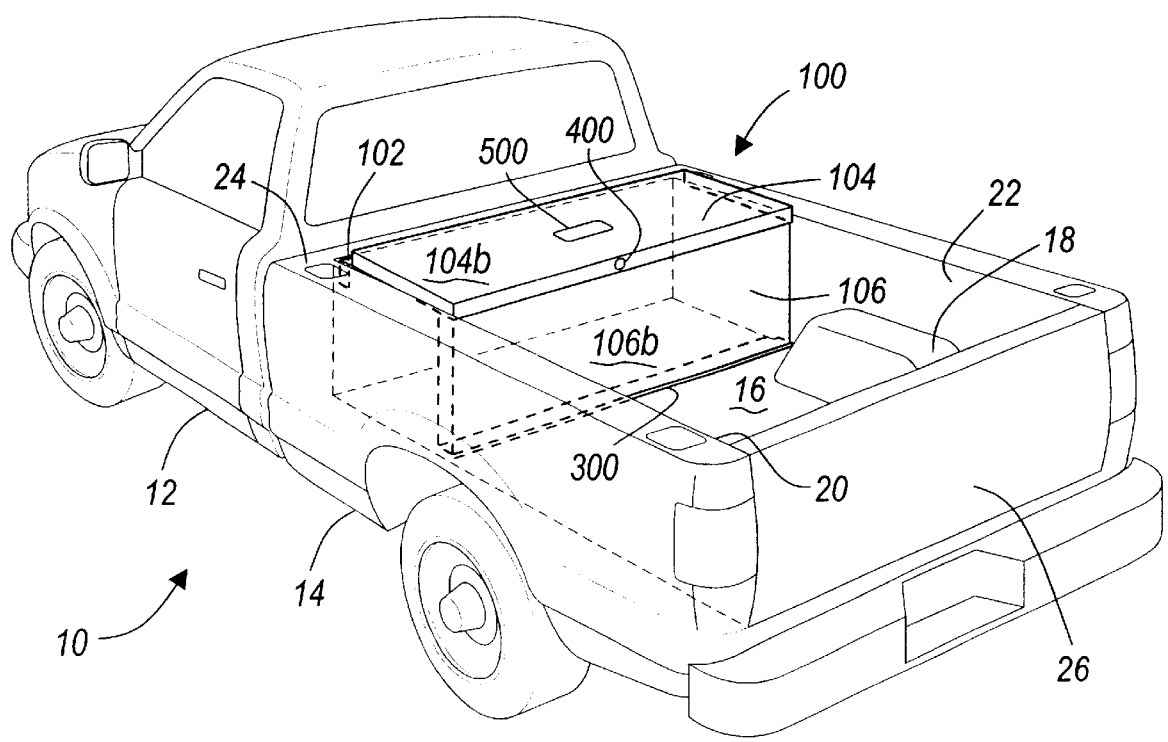
FIG. 3 is a perspective view of a cargo box system in the deployed position, in accordance with the general teachings of the present invention.
Figure 4:
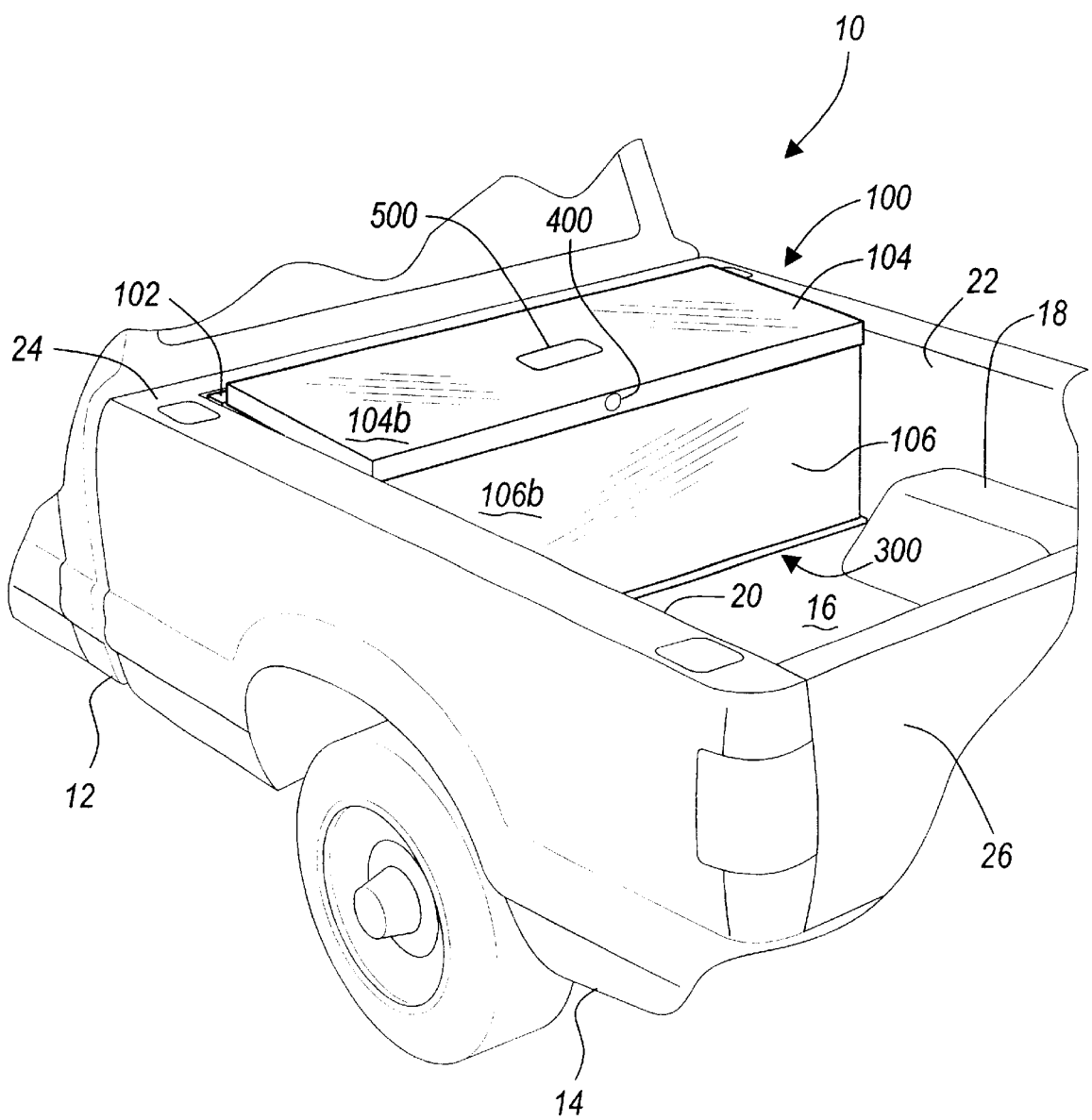
FIG. 4 is a partial perspective view of a cargo box system in the deployed position, in accordance with the general teachings of the present invention.
Figure 5:
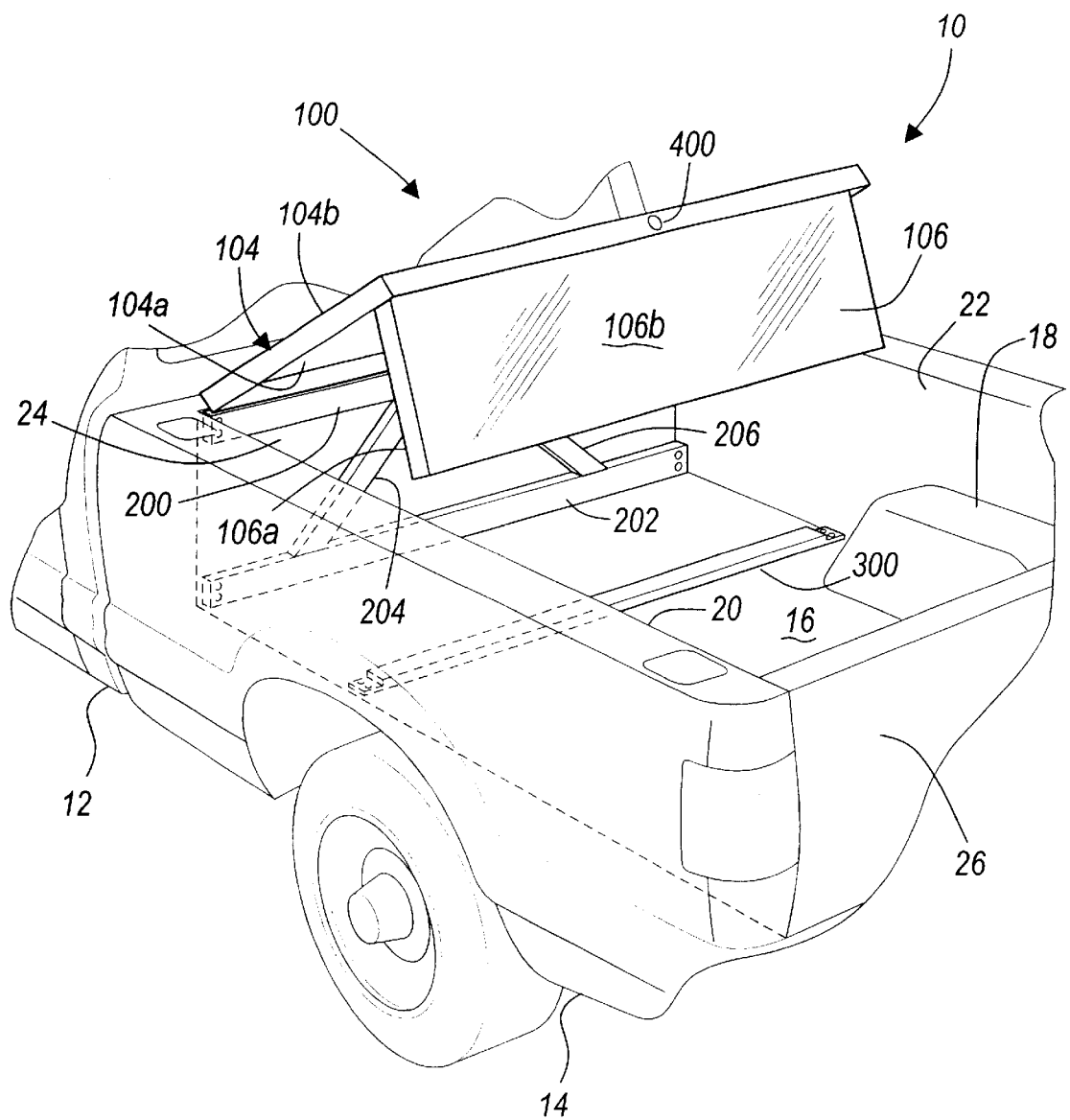
FIG. 5 is a partial perspective view of a cargo box system in a position intermediate between the stowed and the deployed position, in accordance with the general teachings of the present invention.

Referring generally to FIGS. 1–7, there is shown a vehicle 10 commonly referred to a pickup truck having a forward cab portion 12 and a rearward bed portion 14. The bed portion 14 includes a bed surface 16 (having at least one rear wheel housing 18) surrounded by a pair of spaced and opposed sidewalls 20, 22, a front wall 24 (adjacent to a surface of the cab portion 12), and an optional tailgate 26. The bed surface 16 is particularly useful for receiving cargo and loads, and generally speaking, the greater the area of the bed surface 16, the more desirable to consumers.

Disposed within the bed portion 14 is the cargo box system 100, in accordance with the general teachings of the present invention. The cargo box system 100 primarily includes a brace member 102, a first panel 104, and a second panel 106.

The brace member 102 is preferably comprised of a rigid durable material that is capable of withstanding repeated shocks and impacts. Suitable materials include metals, ceramics, composites, thermoplastics, thermosets, woods, and like materials. The exact configuration of the brace member 102 is not thought to be critical to the success of the present invention, provided that the configuration is capable of withstanding repeated shocks and impacts. By way of a non-limiting example, one possible configuration of the brace member 102 includes a first elongated member 200 and a second spaced and opposed second elongated member 202 interconnected by a pair of connecting members 204, 206, as specifically shown in FIG. 6.

The brace member 102 is preferably fastened along the upper and lower edges of the front wall 12, and extends from one end of the bed portion 14 to the spaced and opposed other end of the bed portion 14. By way of a non-limiting example, the first elongated member 200 is fastened to the upper edge of the front wall 12 and the second elongated member 202 is fastened to the lower edge of the front wall 12. The fastening can be accomplished in any number of conventional methods, including, but not limited to screwing the respective members 200, 202 to the front wall via holes 200a, 202a, respectively.

The intended purpose of the pair of connecting members 204, 206 is to absorb any shocks, stresses, or forces applied to the first elongated member 200 and channel those shocks, stresses, or forces away from the first elongated member 200 towards the second elongated member 202, which is preferably abutting against the bed surface 16. In this manner, the first elongated member 200 is capable of absorbing considerable amounts of stress without unintentionally separating from the front wall 12.

A surface of the brace member 102 is rotatably fastened to a surface of the first panel 104, so that the first panel 104 is rotatable about a substantially horizontal axis. The rotatable fastening can be accomplished in any number of conventional methods, including, but not limited to the use of a hinge. The first panel 104 preferably extends from one end of the bed portion 14 to the spaced and opposed other end of the bed portion 14. The first panel 104 preferably includes an inner face 104a and an outer face 104b.

The first panel 104 is preferably comprised of a rigid durable material that is capable of withstanding repeated shocks and impacts. Suitable materials include metals, ceramics, composites, thermoplastics, thermosets, woods, and like materials.

A surface of the first panel 104 is rotatably fastened to a surface of the second panel 106, so that the second panel 106 is rotatable about a substantially horizontal axis. The rotatable fastening can be accomplished in any number of conventional methods, including, but not limited to the use of a hinge. The second panel 106 preferably extends from one end of the bed portion 14 to the spaced and opposed other end of the bed portion 14. The second panel 106 preferably includes an inner face 106a and an outer face 106b.

The second panel 106 is preferably comprised of a rigid durable material that is capable of withstanding repeated shocks and impacts. Suitable materials include metals, ceramics, composites, thermoplastics, thermosets, woods, and like materials.

It is intended that the second panel 106 is capable of being collapsed into, or enveloped by, the inner face 104a of the first panel 104. Accordingly, the inner face 104a is preferably provided with a recess or receptacle therein for receiving the second panel 106.

Figure 6:
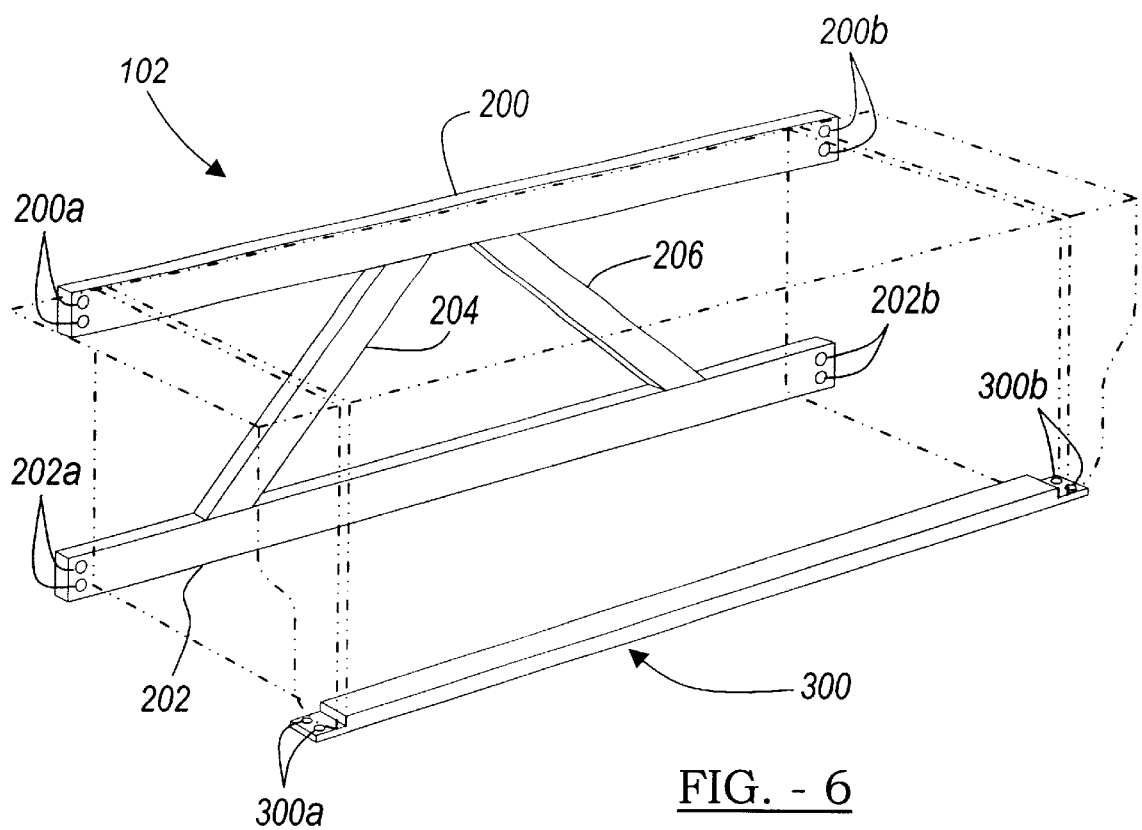
FIG. 6 is a perspective view of a first brace member and an optional second brace member of the cargo box system previously depicted, in accordance with the general teachings of the present invention.
Figure 7:
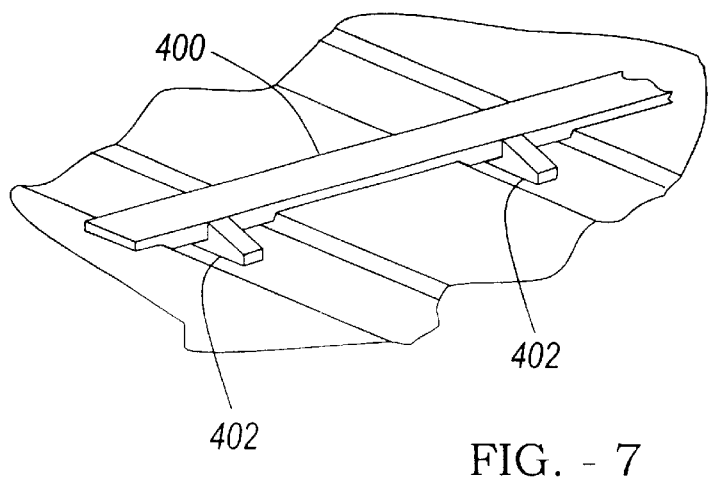
FIG. 7 is a partial perspective view of an alternative design of the optional second brace member previously depicted, in accordance with the general teachings of the present invention.
Figure 8A:
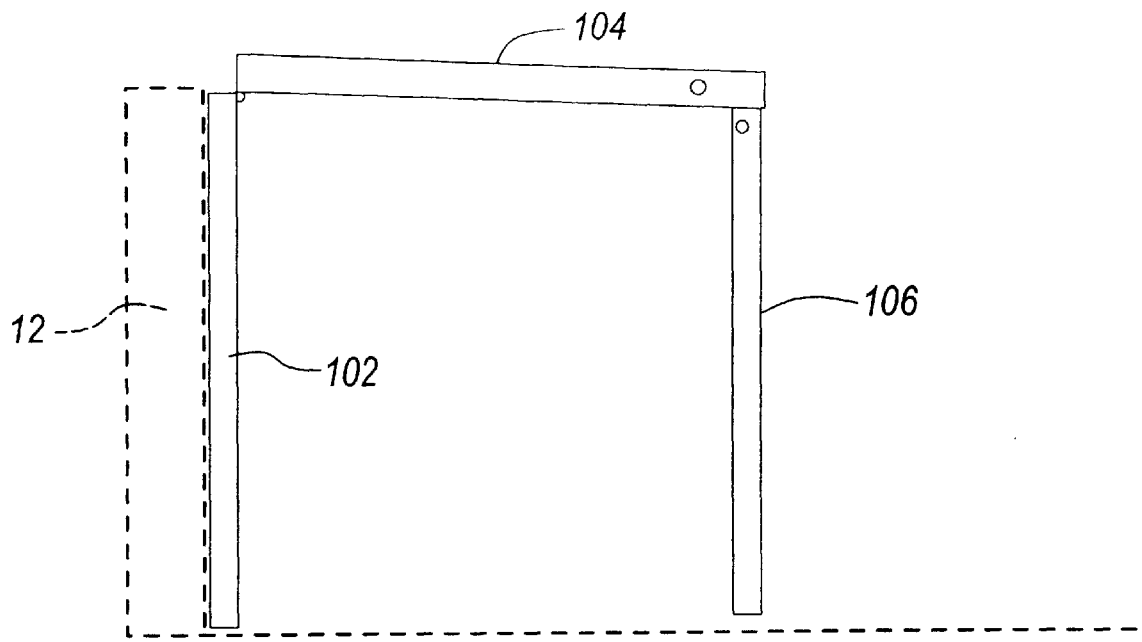
FIGS. 8A, 8B, 8C, and 8D are sectional views of the major steps involved with a cargo box system being positioned from the deployed position to the stowed position, in accordance with the general teachings of the present invention.
Figure 8B:
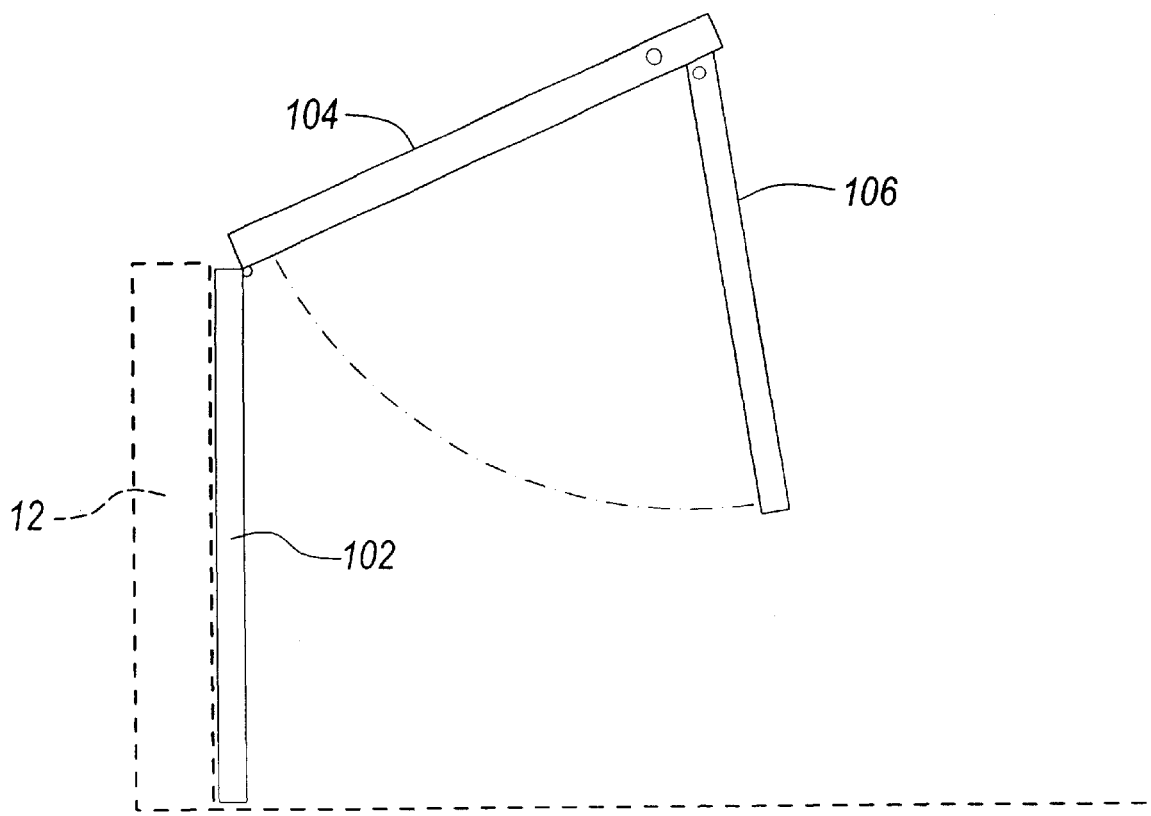
Figure 8C:
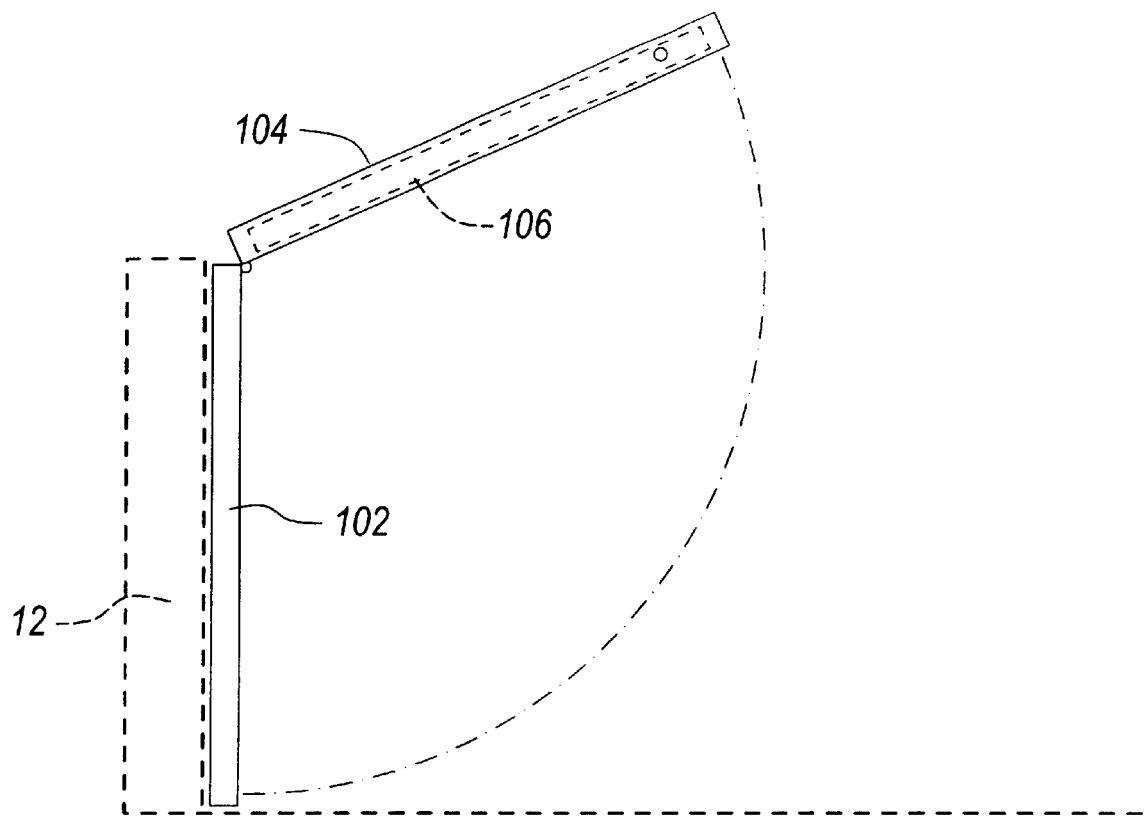
Figure 8D:
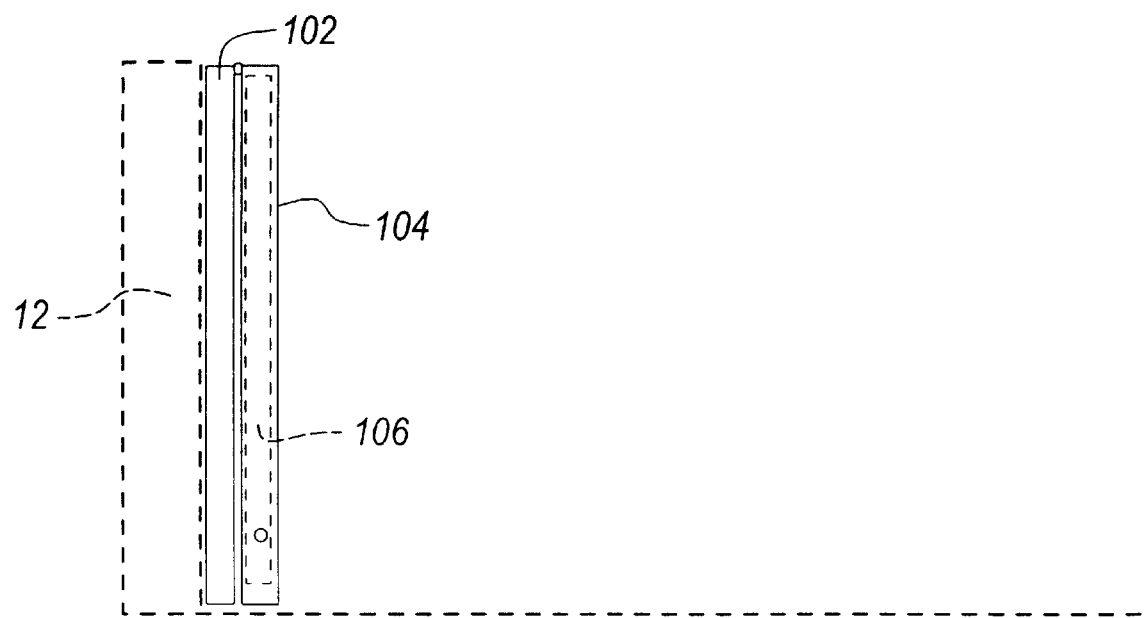

An optional component of the system 100 is a second brace member 300 that is preferably fastened to the bed surface 16, as specifically shown in FIG. 6. The fastening can be accomplished in any number of conventional methods, including, but not limited to screwing the second brace member 300 to the bed surface 16 via holes 300a, 300b, respectively. The second brace member 300 preferably extends from one end of the bed portion 14 to the spaced and opposed other end of the bed portion 14. With specific reference to FIG. 7, an optional configuration of an alternative second brace member 400 is shown with fins 402 for added strength and stability.

The second brace member 300, and any alternative design thereof, is preferably comprised of a rigid durable material that is capable of withstanding repeated shocks and impacts. Suitable materials include metals, ceramics, composites, thermoplastics, thermosets, woods, and like materials.

It is intended that the second brace member 300 engage a surface of the second panel 106 so as to prevent the unintended rotation of the second panel 106. By way of a non-limiting example, by placing the second panel 106 in back of the second brace member 300, it would be difficult for the second panel 106 to hyper-rotate forward in the event the contents of the cargo box system 100 shifted or the cargo box system 100 were over-packed. In this case, a means for preventing the second panel 106 from unintentionally rotating backwards would have to be provided (e.g., a linkage or bracket). By way of another non-limiting example, by placing the second panel 106 in front of the second brace member 300, it would be difficult for a thief to kick in the second panel 106 as the second brace member 300 would prevent any substantial movement of the second panel 106. By way of still another non-limiting example, a male- or female-shaped surface of second panel 106 can mate with a complementary male- or female-shaped surface of the second brace member 300.

Once the system 100 is deployed, it can serve as a storage device for securing tools, implements, and other objects, in the same manner that conventional cargo boxes function. In order to safely secure these items, the system 100 can be provided with one or more lock systems 400. By way of a non-limiting example, the lock system 400 can include a rotatable cylinder that insert one or more rods into one or more pre-drilled holes formed in one or both of the sidewalls 20,22, respectively, so that it is impossible to more either first panel 104 and/or second panel 106 once the lock system 400 has been actuated.

Additionally, when the system 100 is in the deployed position it is not uncommon for heavy items to be dropped or placed onto the outer face 104b of the first panel 104. In conventional cargo box designs, the first panel would normally be directly fastened to the first wall. These forces would create an enormous amount of stress at the fastening point between the first panel and the first wall, potentially causing the first panel to separate from the first wall. The present invention avoids this problem by use of the brace member 102 that absorbs the majority of the stresses caused by the imparting of these forces and directs them away from the fastening point between the first panel 104 and the first wall 12.

Referring specifically to FIGS. 5 and 8A–8D, positioning the system 100 between a deployed position and a collapsed or stowed position, and vice versa, is very simple.

From a deployed position, the operator releases any locks securing the system 100 in place. The operator then preferably grabs an optional handle 500 preferably formed on the first panel 104 and pulls the first panel 104 upwardly. This in turn causes the second panel 106 to rotate vertically about the pivot point formed with the first panel 104. As the first panel 104 continues to rotate to assume a nearly vertical position, the second panel 106 also begins to rotate horizontally about the pivot point formed with the first panel 104 to also assume a nearly vertical position. When the a respective panels 104, 106 are fully rotated, they are preferably abutting and adjacent to one another in a collapsed, recessed or nested position. The respective panels 104, 106 are then rotated in tandem in the opposite horizontal position so as to assume a substantially vertical position, with the respective panels 104, 106 parallel to the brace member 102, with the second panel 106 being adjacent to the brace member 102. The respective panels 104, 106 may then be locked or otherwise secured in place to prevent unintentional partial redeployment of the system 100.

From a stowed position, the operator releases any locks (not shown) securing the system 100 in place. The operator then preferably grabs the optional handle 500 preferably formed on the first panel 104 and pulls the first panel 104 outwardly towards the operator. This in turn causes the first panel 104 to rotate vertically about the pivot point formed with the second panel 106. As the first panel 104 continues to rotate to assume a nearly horizontal position, the second panel 106 (which was stowed within the recess formed in the inner face 104a of the first panel 104) begins to rotate horizontally about the pivot point formed with the first panel 104 to assume a nearly vertical position. When the respective panels 104, 106 are fully rotated, the system 100 is in its fully deployed position.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to fall within the scope of the invention.

What is claimed is:

1. A collapsible storage box system mountable on a vehicle having a substantially horizontally oriented bed surface surrounded by a front wall, a first sidewall, and a spaced and opposed second sidewall, the system comprising:
    a brace member fastened to the front wall;
    a first panel secured adjacent to the brace member so that the first panel is rotatable about a substantially horizontal first axis; and
    a second panel secured to the first panel so as to be rotatable about a substantially horizontal second axis;
    wherein the system is operable to assume a collapsed position in which either the first panel or the second panel is substantially vertically oriented against the front wall and depend from the first axis;
    wherein the system is operable to assume a deployed position in which the first panel is substantially horizontally oriented and the second panel is substantially vertically oriented.

2. The invention according to claim 1, wherein the brace member has a first end and a second end, a first side and a second side, the first side adjacent to the front wall.

3. The invention according to claim 1, wherein the first panel has an inner face and an outer face, a first end and a second end, a first side and a second side, the first end of the first panel secured adjacent to the second side of the brace member.

4. The invention according to claim 1, wherein the second panel has an inner face and an outer face, a first end and a second end, a first side and a second side, the first end of the second panel secured to the second end of the first panel.

5. The invention according to claim 1, wherein when the system has assumed the collapsed position the first panel or the second panel depend from the first axis and the inner face of the first panel and the inner face of the second panel face one another.

6. The invention according to claim 1, wherein when the system has assumed the deployed position the outer face of the first panel faces outwardly away from the bed surface and the outer face of the second panel faces outwardly away from the first panel.

7. The invention according to claim 1, further comprising a second brace member having a first end and a second end, a first side and a second side, the first side adjacent to the bed surface, the second brace member being fastened to the bed surface, the second panel engaging the second brace member.

8. The invention according to claim 1, further comprising a locking system for securing the storage box system to at least a portion of a surface of the vehicle.

9. The invention according to claim 1, wherein the brace member is fastened to an upper surface of the front wall and a lower surface of the front wall.

10. The invention according to claim 1, wherein the brace member includes a first elongated member and a second elongated member interconnected by a pair of connecting members.

11. The invention according to claim 1, wherein the front wall is adjacent to a cab portion of the vehicle.

12. The invention according to claim 1, wherein the vehicle is a pickup truck.

13. A collapsible storage box system mountable on a vehicle having a substantially horizontally oriented bed surface surrounded by a front wall, a first sidewall, and a spaced and opposed second sidewall, the system comprising:
    a brace member having a first end and a second end, a first side and a second side, the first side adjacent to the front wall, the brace member being fastened to the front wall;
    a first panel having an inner face and an outer face, a first end and a second end, a first side and a second side, the first end of the first panel secured adjacent to the second side of the brace member so that the first panel is rotatable about a substantially horizontal first axis; and
    a second panel having an inner face and an outer face, a first end and a second end, a first side and a second side, the first end of the second panel secured to the second end of the first panel so as to be rotatable about a substantially horizontal second axis;
    wherein the system is operable to assume a collapsed position in which either the first panel or the second panel is substantially vertically oriented against the front wall and depend from the first axis and the inner face of the first panel and the inner face of the second panel face one another;
    wherein the system is operable to assume a deployed position in which the first panel is substantially horizontally oriented and the second panel is substantially vertically oriented, the outer face of the first panel facing outwardly away from the bed surface and the outer face of the second panel facing outwardly away from the first panel.

14. The invention according to claim 13, further comprising a second brace member having a first end and a second end, a first side and a second side, the first side adjacent to the bed surface, the second brace member being fastened to the bed surface, the second panel engaging the second brace member.

15. The invention according to claim 13, further comprising a locking system for securing the storage box system to at least a portion of a surface of the vehicle.

16. The invention according to claim 13, wherein the brace member is fastened to an upper surface of the front wall and a lower surface of the front wall.

17. The invention according to claim 13, wherein the brace member includes a first elongated member and a second elongated member interconnected by a pair of connecting members.

18. The invention according to claim 13, wherein the front wall is adjacent to a cab portion of the vehicle.

19. The invention according to claim 13, wherein the vehicle is a pickup truck.

20. A collapsible storage box system mountable on a vehicle having a substantially horizontally oriented bed surface surrounded by a front wall, a first sidewall, and a spaced and opposed second sidewall, the system comprising:

a first brace member having a first end and a second end, a first side and a second side, the first side adjacent to the front wall, the first brace member being fastened to the front wall;

a first panel having an inner face and an outer face, a first end and a second end, a first side and a second side, the first end of the first panel secured adjacent to the second side of the brace member so that the first panel is rotatable about a substantially horizontal first axis;

a second panel having an inner face and an outer face, a first end and a second end, a first side and a second side, the first end of the second panel secured to the second end of the first panel so as to be rotatable about a substantially horizontal second axis; and a second brace member having a first end and a second end, a first side and a second side, the first side adjacent to the bed surface, the second brace member being fastened to the bed surface, the second panel engaging the second brace member;

wherein the system is operable to assume a collapsed position in which either the first panel or the second panel is substantially vertically oriented against the front wall and depend from the first axis and the inner face of the first panel and the inner face of the second panel face one another;

wherein the system is operable to assume a deployed position in which the first panel is substantially horizontally oriented and the second panel is substantially vertically oriented, the outer face of the first panel facing outwardly away from the bed surface and the outer face of the second panel facing outwardly away from the first panel.

21. The invention according to claim 20, further comprising a locking system for securing the storage box system to at least a portion of a surface of the vehicle.

22. The invention according to claim 20, wherein the brace member is fastened to an upper surface of the front wall and a lower surface of the front wall.

23. The invention according to claim 20, wherein the brace member includes a first elongated member and a second elongated member interconnected by a pair of connecting members.

24. The invention according to claim 20, wherein the front wall is adjacent to a cab portion of the vehicle.

25. The invention according to claim 20, wherein the vehicle is a pickup truck.

* * * * *